US008696370B1

(12) United States Patent  
Lin et al.

(10) Patent No.: US 8,696,370 B1  
(45) Date of Patent: Apr. 15, 2014

(54) CARD CONNECTOR (71) Applicant: Proconn Technology Co., Ltd., New Taipei (TW)

(72) Inventors: Chih-Chiang Lin, New Taipei (TW); Ta-Chih Yu, New Taipei (TW)

(73) Assignee: Proconn Technology Co., Ltd., New Taipei (TW)

( * ) Notice: Subject to any disclaimer, the term of this patent is extended or adjusted under 35 U.S.C. 154(b) by 9 days.

(21) Appl. No.: 13/666,689

(22) Filed: Nov. 1, 2012

(51) Int. Cl.  
*H01R 13/62* (2006.01)

(52) U.S. Cl.  
USPC ......................................................... 439/159

(58) Field of Classification Search  
USPC ........................... 439/159, 160, 161, 162, 630  
See application file for complete search history.

(56) References Cited

U.S. PATENT DOCUMENTS

| | | | | |
|---|---|---|---|---|
| 6,951,471 B1 * | 10/2005 | Chen | .............................. | 439/159 |
| 7,056,153 B2 * | 6/2006 | Watanabe et al. | ............. | 439/630 |
| 7,070,430 B2 * | 7/2006 | Yang et al. | .................... | 439/159 |
| 7,322,839 B1 * | 1/2008 | Wu et al. | ........................ | 439/159 |
| 7,670,188 B2 * | 3/2010 | Zhang et al. | .................. | 439/630 |
| 8,038,477 B2 * | 10/2011 | Zhang | ........................... | 439/630 |
| 8,066,528 B1 * | 11/2011 | Hsu et al. | ................. | 439/607.01 |
| 8,172,586 B2 * | 5/2012 | Tsai | .............................. | 439/159 |
| 8,608,511 B2 * | 12/2013 | Zhang | ........................... | 439/630 |

* cited by examiner

*Primary Examiner* — Neil Abrams  
*Assistant Examiner* — Phuongchi T Nguyen  
(74) *Attorney, Agent, or Firm* — Muncy, Geissler, Olds & Lowe, P.C.

(57) ABSTRACT

A card connector includes an insulating housing, a plurality of conductive terminals disposed to the insulating housing, an ejection mechanism and a shielding shell. The insulating housing defines a receiving trough. The ejection mechanism includes a sliding block slidably disposed to the receiving trough, and an elastic element restrained between the sliding block and a corresponding rear wall of the insulating housing. The sliding block has two clipping portions. A top surface of each clipping portion protrudes upward to form a stopping portion of which a front surface is defined as a stopping face. The shielding shell is covered on the insulating housing. One side of a top plate of the shielding shell defines an elastic piece. Two opposite sides of a rear edge of the elastic piece form two resisting portions resisting against the stopping faces to lock the SIM card in the card connector.

12 Claims, 9 Drawing Sheets

CARD CONNECTOR

BACKGROUND OF THE INVENTION

1. Field of the Invention

The present invention generally relates to a card connector, and more particularly to a card connector adapted for being communicated between a SIM (subscriber identity module) card and a circuit board of a communication device.

2. The Related Art

A conventional card connector adapted for being communicated between a SIM card and a circuit board of a communication device includes an insulating housing, a plurality of conductive terminals received in the insulating housing, an ejection mechanism which includes a sliding block, an elastic element and a guide pin, and a shielding shell. The insulating housing has a bottom wall, two side walls extending upward from two opposite sides of the bottom wall, a front wall and a rear wall connecting with a front end and a rear end of one side wall, respectively. The bottom wall of the insulating housing defines a plurality of terminal grooves each penetrating through a top and a rear of the bottom wall. The front wall defines a fastening groove. The sliding block has a base body, and a pushing portion extending sideward from one side of the base body. The base body of the sliding block defines a heart-shaped guiding groove. A blocking portion is protruded upward from a bottom sidewall of the guiding groove.

The conductive terminals are disposed to the terminal grooves with contact portions thereof projecting beyond the top of the bottom wall to contact with the SIM card and soldering portions thereof projecting behind the rear of the bottom wall to be soldered with the circuit board. The sliding block is slidably located in one side of the insulating housing adjacent to the front wall and the rear wall, with the pushing portion projecting on the bottom wall. The elastic element is located between the rear wall of the insulating housing and the base body of the sliding block. One end of the guide pin is fastened in the fastening groove of the front wall of the insulating housing and the other end of the guide pin is slidably located in the guiding groove of the sliding block. The shielding shell is covered on the insulating housing to define a receiving space between the shielding shell and the insulating housing.

When the SIM card is inserted into the receiving space of the card connector, the SIM card is pushed rearward to resist against the pushing portion so as to drive the sliding block to slide rearward and the guide pin to slide in the guiding groove until the SIM card is fully inserted into the receiving space of the card connector. At the moment, the guide pin is blocked by the blocking portion in the guiding grdove so as to lock the SIM card in the card connector. In that case, the elastic element is compressed between the rear wall of the insulating housing and the base body of the sliding block. When the SIM card is drawn out from the receiving space, the SIM card is pushed rearward again to make the guide pin break away from the blocking portion and re-slide in the guiding groove. Then the elastic element is released to drive the sliding block to slide forward until the guide pin returns to an original position in the guiding groove so as to eject the SIM card out of the card connector by virtue of the pushing action of the pushing portion.

However, the SIM card is locked in the receiving space of the card connector by means of the guide pin being blocked by the blocking portion at the time of the SIM card being fully inserted into the receiving space of the card connector. When the SIM card is accidentally pushed rearward again by an external force in use, the pushing portion easily springs the SIM card out through the released elasticity from the elastic element. As a result, the communication between the SIM card and the circuit board is undeservedly interrupted. So, a card connector capable of overcoming the foregoing problem is required.

SUMMARY OF THE INVENTION

An object of the present invention is to provide a card connector adapted for being communicated between a SIM card and a circuit board. The card connector includes an insulating housing, a plurality of conductive terminals, an ejection mechanism and a shielding shell. The insulating housing has a bottom wall, a first side wall and a second side wall extending upward from two opposite sides of the bottom wall, a front wall extending upward from one side of a front of the bottom wall adjacent to the second side wall, and two rear walls extending upward from two opposite sides of a rear of the bottom wall and connected with the first side wall and the second side wall respectively. One side of a top surface of the bottom wall is concaved downward to form a receiving trough extending along a front-to-rear direction between the front wall and the rear wall connected with the second side wall. Each of the conductive terminals is disposed to the insulating housing with a contact arm defined at a front thereof projecting beyond the top surface of the bottom wall to electrically contact the SIM card, and a soldering arm defined at a rear thereof projecting behind the bottom wall to be soldered with the circuit board. The ejection mechanism includes a sliding block slidably disposed to the receiving trough, and an elastic element restrained between the sliding block and the corresponding rear wall of the insulating housing. The sliding block has a base body located in the receiving trough, a pushing body extending sideward from a rear end of one side surface of the base body to project on the top surface of the bottom wall, and two clipping portions extending forward from two opposite sides of a front surface of the base body to be located in the receiving trough. A substantial middle of a top surface of each clipping portion protrudes upward to form a stopping portion of which a front surface is perpendicular to the top surface of the clipping portion and defined as a stopping face. The shielding shell is covered on the insulating housing to form an inserting space between the insulating housing and the shielding shell for receiving the SIM card therein. The shielding shell has a top plate. One side of the top plate defines a die-cut hole. A front inner sidewall of the die-cut hole slantwise extends downward and rearward to form an elastic piece spaced from a rear inner sidewall of the die-cut hole. Two opposite sides of a rear edge of the elastic piece are curved towards a bottom face of the elastic piece to form two resisting portions. In the process of the SIM card being inserted into the inserting space of the card connector and pushing the sliding block to move rearward via resisting against the pushing body, the elastic piece is elastically propped upward by the stopping portion via the resisting portions relatively sliding forward along a top of the stopping portion, when the SIM card is inserted in place, the resisting portions slip off from the stopping portion to resist against the stopping face to lock the SIM card in the card connector.

As described above, the card connector completes the card locking action by virtue of the resisting portions of the elastic piece resisting against the stopping faces of the stopping portions when the SIM card is inserted in place. Thus, the card connector has a stable card locking way to make the SIM card contact with the card connector steadily for ensuring a usability of the communication device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
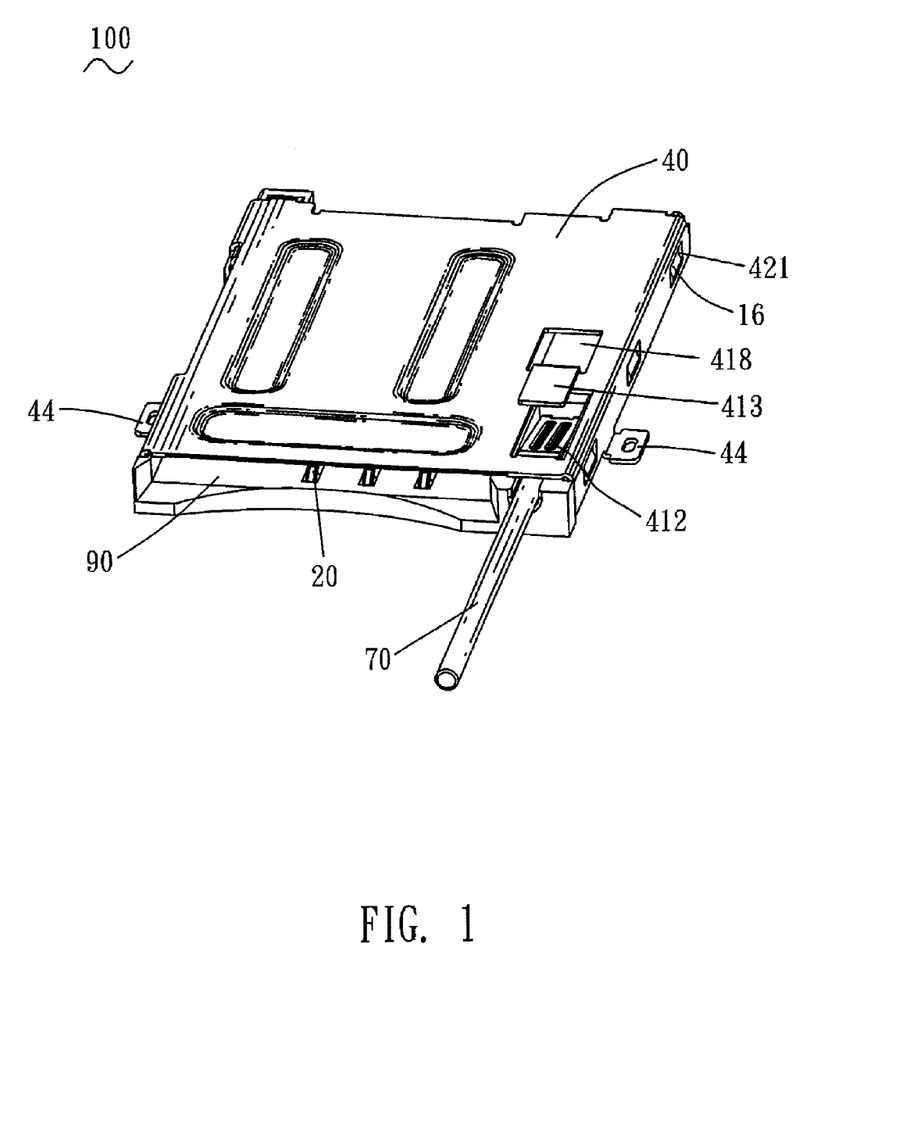
FIG. 1 is a perspective view of a card connector in accordance with the present invention.
Figure 2:
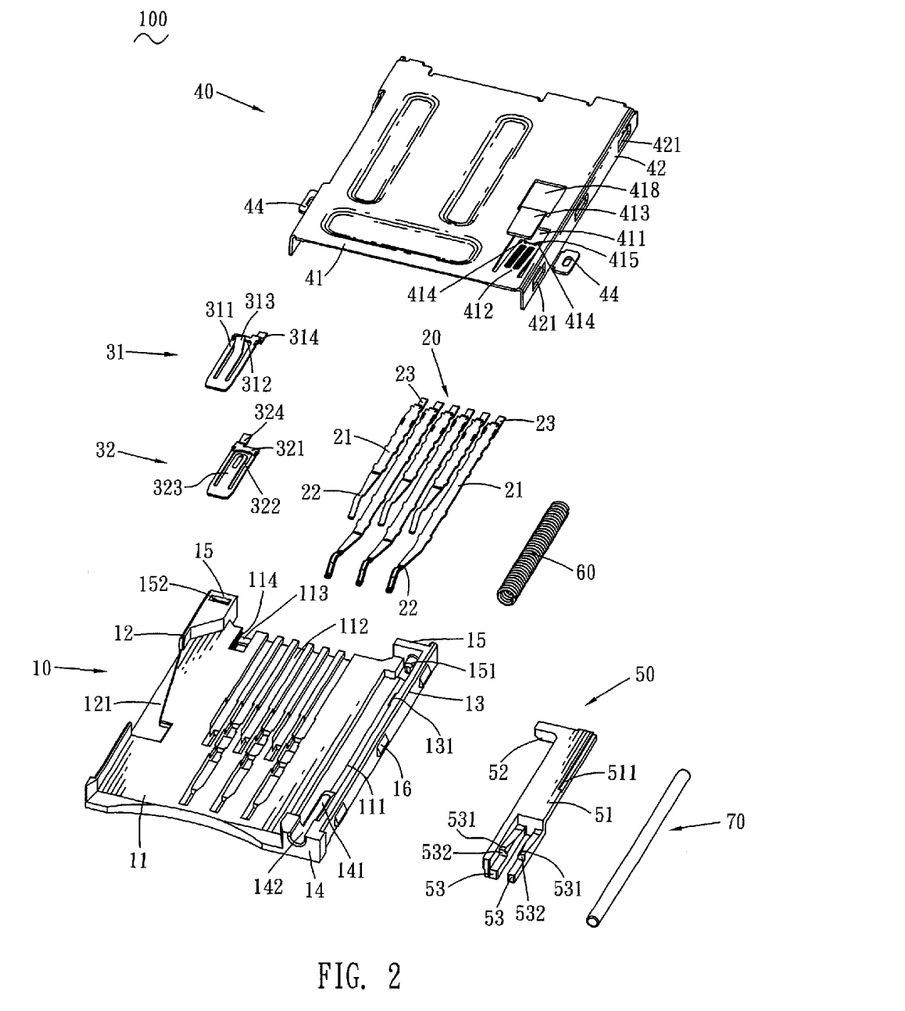
FIG. 2 is an exploded view of the card connector of FIG. 1.
Figure 6:
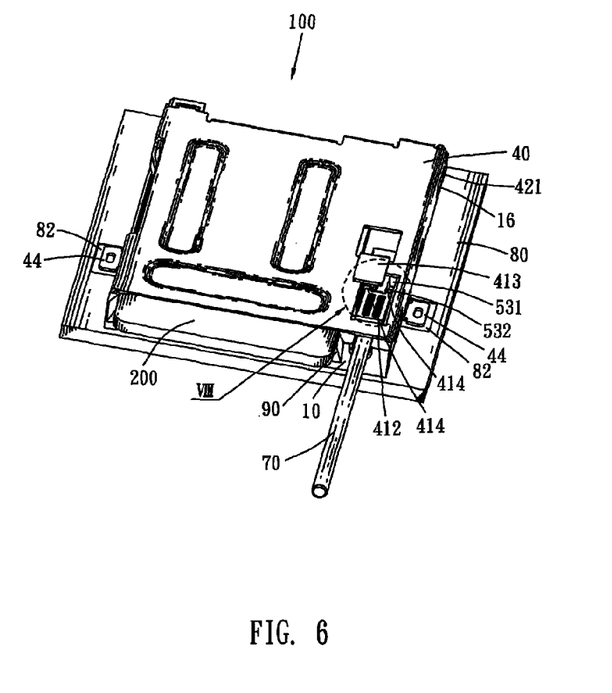
FIG. 6 is a perspective view of the card connector of FIG. 4, wherein the card connector is mounted on the circuit board with the SIM card being inserted thereto.
Figure 7:
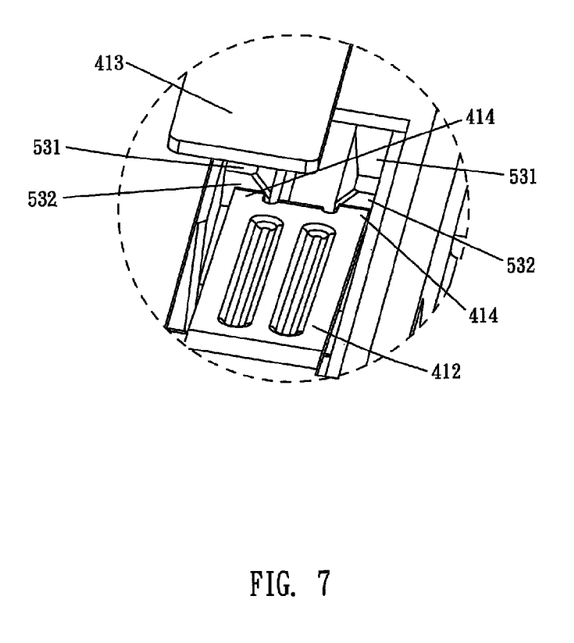
FIG. 7 is an enlarged view of an encircled portion VIII of the card connector of FIG. 6.
Figure 8:
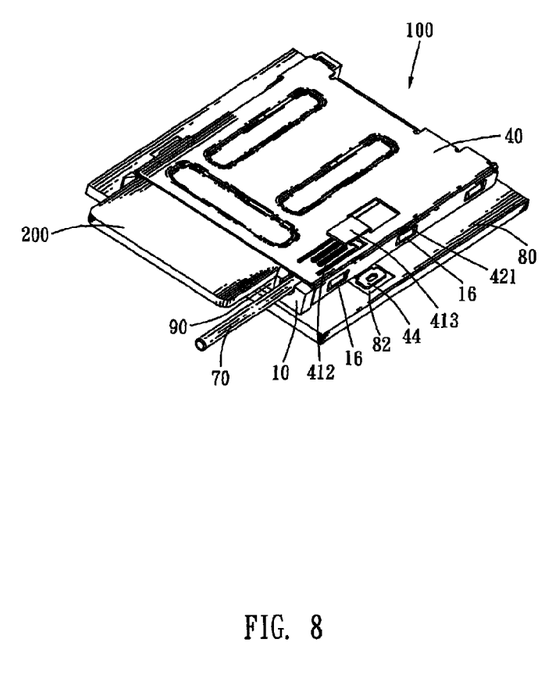
FIG. 8 is another perspective view of the card connector of FIG. 1, wherein the card connector is mounted on the circuit board with the SIM card being inserted thereto.

With reference to FIG. 1, FIG. 2 and FIG. 6, a card connector 100 in accordance with the present invention is shown. The card connector 100 adapted for being communicated between a SIM card 200 and a circuit board 80 of a communication device (not shown) includes an insulating housing 10, a plurality of conductive terminals 20, a first switch terminal 31, a second switch terminal 32, an ejection mechanism and a shielding shell 40.

Figure 4:
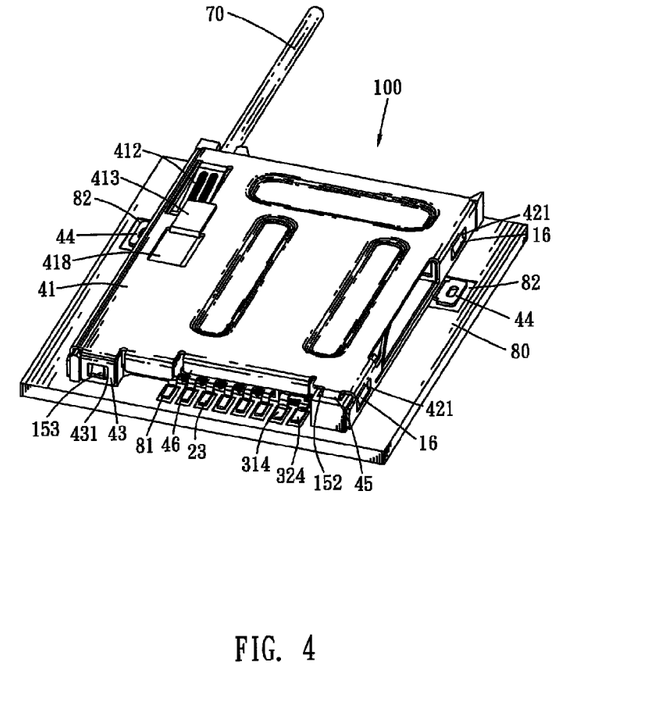
FIG. 4 is a perspective view of the card connector of FIG. 1, wherein the card connector is mounted to a circuit board.
Figure 5:
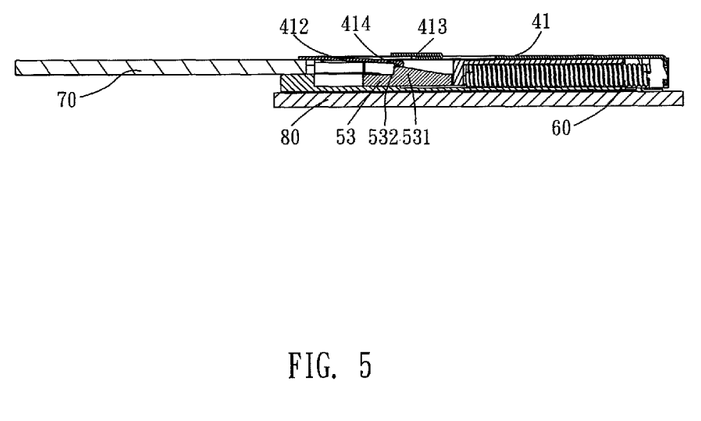
FIG. 5 is a sectional view showing a status of a SIM card being inserted into the card connector of FIG. 4, wherein the card connector is mounted on the circuit board.

Referring to FIG. 1, FIG. 2 and FIG. 4, the insulating housing 10 has a bottom wall 11 of a substantial rectangular shape, a first side wall 12 and a second side wall 13 extending upward from two opposite sides of the bottom wall 11, a front wall 14 extending upward from one side of a front of the bottom wall 11 and connected with the second side wall 13, and two rear walls 15 extending upward from two opposite sides of a rear of the bottom wall 11 and connected with the first side wall 12 and the second side wall 13 respectively. One side of a top surface of the bottom wall 11 is concaved downward to form a receiving trough 111 extending along a front-to-rear direction between a rear surface of the front wall 14 and a front surface of the rear wall 15 connected with the second side wall 13. A portion of the rear surface of the front wall 14 of the insulating housing 10 protrudes rearward to form a supporting block 141 connecting with a bottom sidewall of the receiving trough 111. A portion of the front surface of the rear wall 15 protrudes forward to form a location pillar 151. The insulating housing 10 defines a guiding groove 142 extending along the front-to-rear direction to pass through a top surface of the supporting block 141 and a middle of a top of the front wall 14 of the insulating housing 10. A substantial middle of the bottom wall 11 defines a plurality of conductive terminal grooves 112 of which each penetrates through the top surface and a rear surface of the bottom wall 11. The bottom wall 11 defines a switch terminal groove 113 located between the first side wall 12 and the conductive terminal grooves 12. A rear of the switch terminal groove 113 penetrates through the rear surface of the bottom wall 11 and a middle of the switch terminal groove 113 vertically penetrates through the bottom wall 11. Two middles of two facing sidewalls of the switch terminal groove 113 protrude face to face to form two loading portions 114. The insulating housing 10 defines a restricting groove 121 penetrating through a substantial middle of the first side wall 12 and a middle of the other side of the top surface of the bottom wall 11. Two outer surfaces of the first side wall 12 and the second side wall 13 protrude outward to form a plurality of buckling portions 16. The rear wall 15 connected with the first side wall 12 defines an inserting slot 152 penetrating through a top thereof. A rear surface of the rear wall 15 connected with the second side wall 13 protrude rearward to form a fastening portion 153. An upper portion of a rear of the second side wall 13 of the insulating housing 10 protrudes inward to form a limiting block 131.

Referring to FIG. 2, each of the conductive terminals 20 has an elongated fastening arm 21, a contact arm 22 slantwise extended upward and then arched upward from a front end of the fastening arm 21, and a soldering arm 23 extended downward and then bent rearward from a rear end of the fastening arm 21.

Referring to FIG. 2 again, the first switch terminal 31 has a rectangular first locating portion 311. A middle of the first locating portion 311 defines a first opening 312. A front inner sidewall of the first opening 312 extends rearward and then slantwise extends upward and rearward to form a first touch portion 313 spaced from a rear inner sidewall of the first opening 312. One side of a rear end of the first locating portion 311 extends downward, and then is bent rearward to form a first soldering portion 314. The second switch terminal 32 has a rectangular second locating portion 321. A middle of the second locating portion 321 defines a second opening 322. A front inner sidewall of the second opening 322 extends rearward to form a second touch portion 323 spaced from a rear inner sidewall of the second opening 322. One side of a rear end of the second locating portion 321 extends downward, and then is bent rearward to form a second soldering portion 324.

Referring to FIGS. 2-9, the ejection mechanism includes a sliding block 50, an elastic element 60 and an operating pillar 70. The sliding block 50 has a rectangular base body 51, a pushing body 52 extending sideward from a rear end of one side surface of the base body 51, and two clipping portions 53 extending forward from two opposite sides of a front surface of the base body 51. The two clipping portions 53 are spaced from each other. A substantial middle of a top surface of each clipping portion 53 protrudes upward to form a stopping portion 531 of which a front surface is perpendicular to the top surface of the clipping portion 53 and defined as a stopping face 532. A top of the stopping portion 531 is designed as a slope gradually inclined downward along the front-to-rear direction. A rear of a top edge of the other side surface of the base body 51 opposite to the pushing body 52 is concaved inward to form a limiting slot 511. A bottom of the base body 51 defines a holding groove 512 passing through the corresponding side surface opposite to the pushing body 52 and a rear surface of the base body 51.

Figure 3:
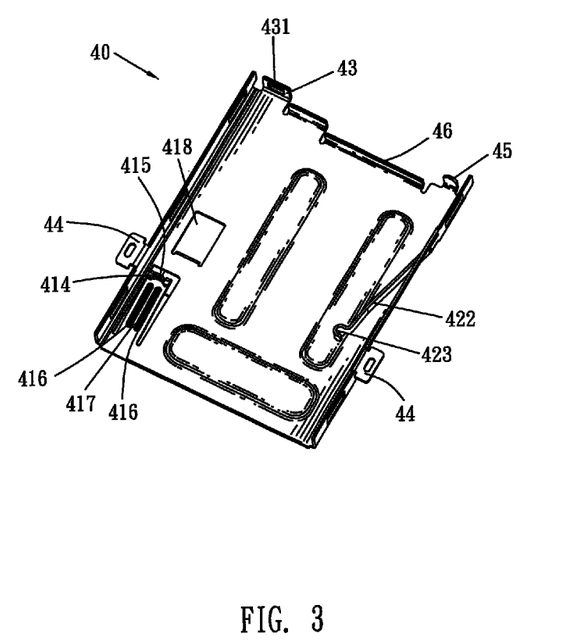
FIG. 3 is a perspective view of a shielding shell of the card connector of FIG. 2.

Referring to FIG. 2, FIG. 3 and FIG. 4, the shielding shell 40 has a top plate 41, and two lateral plates 42 extending downward from two opposite sides of the top plate 41. One side of a rear edge of the top plate 41 extends downward to form a fastening piece 43 with a fastening hole 431 being opened to fasten the fastening portion 153 therein. The other side of the rear edge of the top plate 41 extends downward to form an inserting piece 45. A substantial middle of the rear end edge of the top plate 41 extends downward to form a blocking plate 46 located between the fastening piece 43 and the inserting piece 45. Two bottom edges of the two lateral plates 42 are bent oppositely to form two soldering pieces 44. One side of the top plate 41 defines a rectangular die-cut hole 411 and a punching groove 418 located in rear of the die-cut hole 411. A front inner sidewall of the die-cut hole 411 slantwise extends downward and rearward to form an elastic piece 412 spaced from a rear inner sidewall of the die-cut hole 411. A front inner sidewall of the punching groove 418 is bent forward and further extends forward to form a limiting piece 413 abutting against the top plate 41 and further projecting over a rear of the elastic piece 412. Two opposite sides of a rear edge of the elastic piece 412 are curved towards a bottom face of the elastic piece 412 to form two resisting portions 414. A middle of the rear edge of the elastic piece 412 extends downward to form a blocking piece 415. Two opposite sides of a top face of the elastic piece 412 are concaved downward to form two ribs 416 on the bottom face of the elastic piece 412. The two ribs 416 are spaced from each other to form a passageway 417. The two lateral plates 42 of the shielding shell 40 define a plurality of buckling holes 421 for buckling the buckling portions 16 therein. A substantial middle of the lateral plate 42 away from the die-cut hole 411 is punched inward to form an elastic arm 422 of which a free end is arched inward to form an abutting portion 423.

Referring to FIG. 4 and FIG. 6, the circuit board 80 is of a rectangular board shape. A top face of the circuit board 80 defines a plurality of first soldering pads 81 located in a rear thereof, and two symmetrical second soldering pads 82 respectively located at two opposite sides thereof. The first soldering pads 81 are transversely arranged at regular intervals and in alignment with one another.

Referring to FIGS. 1-9, when the card connector 100 is assembled, each of the conductive terminals 20 is disposed to the conductive terminal groove 112 of the insulating housing 10 with the fastening arm 21 defined at a middle thereof being fastened in the conductive terminal groove 112, the contact arm 22 defined at a front thereof projecting beyond the top surface of the bottom wall 11 to electrically contact with the SIM card 200, and the soldering arm 23 defined at a rear thereof projecting behind the rear surface of the bottom wall 11 to be soldered with the circuit board 80. The first switch terminal 31 is disposed to a top of the switch terminal groove 113 and the second switch terminal 32 is disposed to a bottom of the switch terminal groove 113. Specifically, two opposite sides of the first locating portion 311 are located on the two loading portions 114, the first touch portion 313 projects beyond the top surface of the bottom wall 11 through a top of the middle of the switch terminal groove 113 to contact with the SIM card 200, and the first soldering portion 314 projects behind the rear surface of the bottom wall 11 to be soldered with the circuit board 80. Two opposite sides of the second locating portion 321 are located on two opposite sides of a bottom sidewall of the switch terminal groove 113, the second touch portion 323 is located in a bottom of the middle of the switch terminal groove 113 and located under the first touch portion 313, and the second soldering portion 324 projects behind the rear surface of the bottom wall 11 to be soldered with the circuit board 80. The soldering arms 23 of the conductive terminals 20 are in alignment with and flush with the first soldering portion 314 of the first switch terminal 31 and the second soldering portion 324 of the second switch terminal 32.

Then the ejection mechanism is disposed to one side of the insulating housing 10. The sliding block 50 is slidably disposed to the receiving trough 111 with the base body 51 and the two clipping portions 53 being located in the receiving trough 111, and the pushing body 52 projecting on the top surface of the bottom wall 11. The supporting block 141 is located between the clipping portions 53 of the sliding block 50 to guide the movement of the sliding block 50 in the receiving trough 111. The holding groove 512 is coupled with the receiving trough 111 for receiving the elastic element 60 therein. One end of the elastic element 60 is worn around the location pillar 151 and against the front surface of the rear wall 15, and the other end of the elastic element 60 is against a front sidewall of the holding groove 512 of the base body 51 so that the elastic element 60 is restrained between the base body 51 of the sliding block 50 and the corresponding rear wall 15 of the insulating housing 10. The limiting block 131 is limited in the limiting slot 511 by a relative motion way. The shielding shell 40 is covered on the insulating housing 10 to form an inserting space 90 between the insulating housing 10 and the shielding shell 40 for receiving the SIM card 200 therein. The buckling portions 16 are buckled in the buckling holes 421. The fastening portion 153 is fastened in the fastening hole 431. The inserting piece 45 is inserted in the inserting slot 152. The blocking plate 46 is located in rear of the bottom wall 11. The elastic piece 412 is located above the clipping portions 53 with the two resisting portions 414 thereof located in a rear of the slope. The guiding groove 142 faces the blocking piece 415 at a distance. The restricting groove 121 communicates with the inserting space 90. The elastic arm 422 with the abutting portion 423 is received in the restricting groove 121 and partially projects into the inserting space 90 to make the abutting portion 423 against one side of the SIM card 200. The operating pillar 70 is capable of being pushed to project into or pulled out from the card connector 100 along the passageway 417 and the guiding groove 142. When the card connector 100 is mounted to the circuit board 80, the soldering arms 23 of the conductive terminals 20 are soldered with the first soldering pads 81 of the circuit board 80, and the first soldering portion 314 of the first switch terminal 31 and the second soldering portion 324 of the second switch terminal 32 are soldered with the second soldering pads 82 of the circuit board 80.

Referring to FIGS. 1-7, in the process of the SIM card 200 being inserted into the inserting space 90 of the card connector 100 and pushing the sliding block 50 to move rearward via resisting against the pushing body 52 so as to compress the elastic element 60 between the front surface of the rear wall 15 and the front sidewall of the holding groove 512 of the base body 51, the elastic piece 412 is elastically propped upward by the stopping portion 531 via the resisting portions 414 relatively sliding forward along the slope of the stopping portion 531. The limiting block 131 is limited in the limiting slot 511 by the relative movement way for effectively ensuring the sliding block 50 to slide rearward steadily. At the time of the SIM card 200 being inserted in place, the resisting portions 414 of the elastic piece 412 slip off from the slopes of the stopping portions 531 to resist against the stopping faces 532 of the stopping portions 531 to lock the SIM card 200 in the card connector 100 so as to complete a card locking action. The abutting portion 423 of the elastic arm 422 abuts against the one side of the SIM card 200 so as to make the SIM card 200 inserted into the inserting space 90 of the card connector 100 stably. The blocking plate 46 of the shielding shell 40 can effectively prevent the SIM card 200 overly being inserted into the inserting space 90 of the card connector 100. The contact arms 22 of the conductive terminals 20 contact with metal pieces (not shown) of the SIM card 200 to realize an electrical connection between the SIM card 200 and the card connector 100 so that the SIM card 200 electrically connects with the circuit board 80 by the card connector 100. The SIM card 200 presses down on a top of the first touch portion 313 of the first switch terminal 31 to make a bottom of the first touch portion 313 contact with a top of the second touch portion 323 of the second switch terminal 32 so as to realize a switch function of the first switch terminal 31 and the second switch terminal 32.

Figure 9:
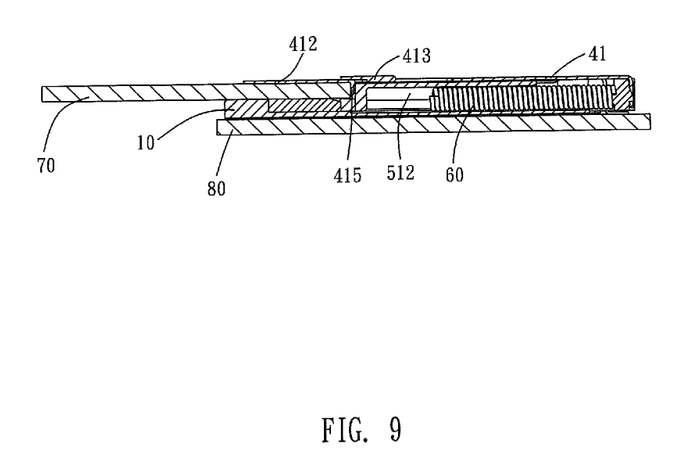
FIG. 9 is a sectional view of the card connector of FIG. 1, wherein the card connector is mounted on the circuit board with the SIM card being ejected out thereof.

When the SIM card 200 needs to be withdrawn from the card connector 100, the operating pillar 70 is inserted rearward in the guiding groove 142 to stretch under the elastic piece 412, then the operating pillar 70 is pushed rearward to gradually eject the elastic piece 412 upward and further bring the resisting portions 414 away from the stopping face 532 of the stopping portion 531 so as to set free the elastic element 60 and the sliding block 50 to push the SIM card 200 out. The guiding groove 412 and the passageway 417 cooperate to guide the insertion and extraction of the operating pillar 70. The operating pillar 70 continues moving rearward until a rear surface of the operating pillar 70 resists against the blocking piece 415 of the shielding shell 40. The blocking piece 415 is capable of stopping the insertion of the operating pillar 70 and preventing an excessive insertion of the operating pillar 70. In that case, the SIM card 200 is ejected out of the card connector 100 and can be successfully drawn out from the card connector 100 so as to complete a card receding action. The bottom of the first touch portion 313 is apart away from the top of the second touch portion 323 of the second switch terminal 32 so as to realize the switch function of the first switch terminal 31 and the second switch terminal 32. The limiting piece 413 abuts against the top plate 41 and further projects over the rear of the elastic piece 412 for avoiding the elastic piece 412 from being overly propped upward by the operating pillar 70. The operating pillar 70 can be replaced by a needle-like object or a clip.

As described above, the card connector 100 completes the card locking action by virtue of the resisting portions 414 of the elastic piece 412 resisting against the stopping faces 532 of the stopping portions 531 when the SIM card 200 is inserted in place. The card connector 100 completes the card receding action by virtue of the elastic piece 412 being supported by the operating pillar 70 to be bounced upward so as to make the resisting portions 414 of the elastic piece 412 apart away from the stopping face 532 of the stopping portion 531. Thus, the card connector 100 has a stable card locking way to make the SIM card 200 contact with the card connector 100 steadily for ensuring a usability of the communication device.

What is claimed is:

1. A card connector adapted for being communicated between a SIM card and a circuit board, comprising:

an insulating housing having a bottom wall, a first side wall and a second side wall extending upward from two opposite sides of the bottom wall, a front wall extending upward from one side of a front of the bottom wall and connected with the second side wall, and two rear walls extending upward from two opposite sides of a rear of the bottom wall and connected with the first side wall and the second side wall respectively, one side of a top surface of the bottom wall being concaved downward to form a receiving trough extending along a front-to-rear direction between the front wall and the rear wall connected with the second side wall;

a plurality of conductive terminals of which each is disposed to the insulating housing with a contact arm defined at a front thereof projecting beyond the top surface of the bottom wall to electrically contact with the SIM card, and a soldering arm defined at a rear thereof projecting behind the bottom wall to be soldered with the circuit board;

an ejection mechanism including a sliding block slidably disposed to the receiving trough of the insulating housing, and an elastic element restrained between the sliding block and the corresponding rear wall of the insulating housing, the sliding block having a base body located in the receiving trough, a pushing body extending sideward from a rear end of one side surface of the base body to project on the top surface of the bottom wall, and two clipping portions extending forward from two opposite sides of a front surface of the base body to be located in the receiving trough, a substantial middle of a top surface of each clipping portion protruding upward to form a stopping portion of which a front surface is perpendicular to the top surface of the clipping portion and defined as a stopping face; and a shielding shell covered on the insulating housing to form an inserting space between the insulating housing and the shielding shell for receiving the SIM card therein, the shielding shell having a top plate, one side of the top plate defining a die-cut hole, a front inner sidewall of the die-cut hole slantwise extending downward and rearward to form an elastic piece spaced from a rear inner sidewall of the die-cut hole, two opposite sides of a rear edge of the elastic piece being curved towards a bottom face of the elastic piece to form two resisting portions, wherein in the process of the SIM card being inserted into the inserting space of the card connector and pushing the sliding block to move rearward via resisting against the pushing body, the elastic piece is elastically propped upward by the stopping portion via the resisting portions relatively sliding forward along a top of the stopping portion, when the SIM card is inserted in place, the resisting portions slip off from the stopping portion to resist against the stopping face to lock the SIM card in the card connector.

2. The card connector as claimed in claim 1, wherein the top of the stopping portion is designed as a slope gradually inclined downward along the front-to-rear direction, in the process of inserting the SIM card into the inserting space, the resisting portions relatively slide forward along the slope of the stopping portion to make the elastic piece gradually propped upward by the slope.

3. The card connector as claimed in claim 1, wherein a middle of the rear edge of the elastic piece extends downward to form a blocking piece, the insulating housing defines a guiding groove penetrating through a top of the front wall to face the blocking piece at a distance, the card connector further includes an operating pillar, when the SIM card needs to be withdrawn from the card connector, the operating pillar is inserted rearward in the guiding groove to stretch under the elastic piece, then the operating pillar is pushed rearward to gradually eject the elastic piece upward and further bring the resisting portions away from the stopping face of the stopping portion so as to set free the elastic element and the sliding block to push the SIM card out, the blocking piece is capable of stopping the insertion of the operating pillar and preventing an excessive insertion of the operating pillar.

4. The card connector as claimed in claim 3, wherein a rear surface of the front wall of the insulating housing protrudes rearward to form a supporting block connecting with a bottom sidewall of the receiving trough and located between the clipping portions of the sliding block to guide the movement of the sliding block in the receiving trough, the guiding groove is further extended rearward through a top surface of the supporting block, two opposite sides of a top face of the elastic piece of the shielding shell are concaved downward to form two ribs on the bottom face of the elastic piece, the two ribs are spaced from each other to form a passageway therebetween, the guiding groove and the passageway cooperate to guide the insertion and extraction of the operating pillar.

5. The card connector as claimed in claim 3, wherein the operating pillar can be replaced by a needle-like object or a clip.

6. The card connector as claimed in claim 3, wherein one side of the top plate defines a punching groove located in rear of the die-cut hole, a front inner sidewall of the punching groove is bent forward and further extends forward to form a limiting piece abutting against the top plate and further projecting over a rear of the elastic piece for avoiding the elastic piece from being overly propped upward by the operating pillar.

7. The card connector as claimed in claim 1, wherein an upper portion of a rear of the second sidewall of the insulating housing protrudes inward to form a limiting block, a rear of a top edge of the other side surface of the base body opposite to the pushing body is concaved inward to form a limiting slot, the limiting block is limited in the limiting slot by a relative motion way.

8. The card connector as claimed in claim 1, wherein the bottom wall of the insulating housing defines a switch terminal groove of which a rear penetrates through a rear surface of the bottom wall and a middle vertically penetrates through the bottom wall, the card connector further includes a first switch terminal disposed to a top of the switch terminal groove with a first touch portion thereof projecting beyond the top surface of the bottom wall to contact with the SIM card, and a second switch terminal disposed to a bottom of the switch terminal groove with a second touch portion being located under the first touch portion, the first and the second switch terminals further have a soldering portion respectively projecting behind the rear surface of the bottom wall to be soldered with the circuit board, a bottom of the first touch portion contacts with or is apart away from a top of the second touch portion so as to realize a switch function of the first switch terminal and the second switch terminal.

9. The card connector as claimed in claim 8, wherein two middles of two facing sidewalls of the switch terminal groove protrude face to face to form two loading portions, the first switch terminal has a first locating portion of which two opposite sides are located on the two loading portions, a middle of the first locating portion defines a first opening, a front inner sidewall of the first opening extends rearward and then slantwise extends upward and rearward to form the first touch portion, one side of a rear end of the first locating portion extends downward and then is bent rearward to form a first soldering portion, the second switch terminal has a rectangular second locating portion of which two opposite sides are located on two opposite sides of a bottom sidewall of the switch terminal groove, a middle of the second locating portion defines a second opening, a front inner sidewall of the second opening extends rearward to form the second touch portion, one side of a rear end of the second locating portion extends downward and then is bent rearward to form a second soldering portion.

10. The card connector as claimed in claim 1, wherein the insulating housing defines a restricting groove penetrating through a substantial middle of the first side wall and a middle of the other side of the top surface of the bottom wall to communicate with the inserting space, the shielding shell has two lateral plates extending downward from two opposite sides of the top plate, a substantial middle of the lateral plate away from the die-cut hole is punched inward to form an elastic arm of which a free end is arched inward to form an abutting portion, the elastic arm with the abutting portion is received in the restricting groove and partially projects into the inserting space to make the abutting portion against one side of the SIM card.

11. The card connector as claimed in claim 10, wherein two outer surfaces of the first side wall and the second side wall of the insulating housing protrude outward to form a plurality of buckling portions, the rear wall connected with the first side wall defines an inserting slot penetrating through a top thereof, and a rear surface of the rear wall connected with the second side wall protrude rearward to form a fastening portion, the lateral plates of the shielding shell define a plurality of buckling holes buckling the buckling portions therein, one side of a rear edge of the top plate extends downward to form a fastening piece with a fastening hole being opened to fasten the fastening portion therein, and the other side of the rear edge of the top plate extends downward to form an inserting piece inserted in the inserting slot.

12. The card connector as claimed in claim 10, wherein two bottom edges of the two lateral plates of the shielding shell are bent oppositely to form two soldering pieces soldered with the circuit board.

\* \* \* \* \*